United States Patent
Chen et al.

(10) Patent No.: US 11,635,388 B2
(45) Date of Patent: Apr. 25, 2023

(54) MODIFIED METAL NANOPARTICLE AND METHOD FOR MANUFACTURING THE SAME

(71) Applicant: National Cheng Kung University, Tainan (TW)

(72) Inventors: Chia-Yun Chen, Tainan (TW); Ta-Cheng Wei, Taichung (TW); Tzu-Yu Ou, Taipei (TW); Meng-Chen Lo, Kaohsiung (TW)

(73) Assignee: National Cheng Kung University, Tainan (TW)

( * ) Notice: Subject to any disclaimer, the term of this patent is extended or adjusted under 35 U.S.C. 154(b) by 215 days.

(21) Appl. No.: 17/124,515

(22) Filed: Dec. 17, 2020

(65) Prior Publication Data

US 2022/0163454 A1 May 26, 2022

(30) Foreign Application Priority Data

Nov. 24, 2020 (TW) .................. 109141156

(51) Int. Cl.
*G01N 21/78* (2006.01)
*G01N 27/333* (2006.01)
*B82Y 40/00* (2011.01)
*B82Y 15/00* (2011.01)

(52) U.S. Cl.
CPC .......... *G01N 21/78* (2013.01); *G01N 27/333* (2013.01); *B82Y 15/00* (2013.01); *B82Y 40/00* (2013.01)

(58) Field of Classification Search
CPC ...... G01N 21/78; G01N 27/333; G01N 31/22; G01N 21/293; G01N 27/48; B82Y 15/00; B82Y 40/00
See application file for complete search history.

(56) References Cited

U.S. PATENT DOCUMENTS

| | | | |
|---|---|---|---|
| 9,580,810 B2 * | 2/2017 | Yamasaki | C23C 18/54 |
| 10,683,387 B2 * | 6/2020 | Johnson | A61K 9/06 |
| 2012/0101007 A1 * | 4/2012 | Ahern | C30B 7/00 |
| | | | 506/13 |

(Continued)

FOREIGN PATENT DOCUMENTS

| | | | |
|---|---|---|---|
| TW | 202106883 A | * | 2/2021 |
| WO | 2013/004989 A1 | | 1/2013 |

OTHER PUBLICATIONS

Gilbert et al., "Optimisation of parameters for detection of manganese ion using electrochemical method", IOP Conference Series: Materials Science and Engineering, 2019, 606, pp. 1-11.

*Primary Examiner* — Jennifer Wecker
*Assistant Examiner* — Alea N. Martin
(74) *Attorney, Agent, or Firm* — Winston Hsu

(57) ABSTRACT

A method for manufacturing modified metal nanoparticles includes steps as follows. Metal nanoparticles are provided, wherein each of the metal nanoparticles is a gold nanoparticle or a silver nanoparticle. An ascorbic acid solution is provided, wherein the ascorbic acid solution includes ascorbic acid molecules and/or ascorbic acid ions. A surface modification step is conducted, wherein the metal nanoparticles and the ascorbic acid solution are mixed, such that surfaces of the metal nanoparticles are modified by the ascorbic acid molecules and/or ascorbic acid ions to obtain the modified metal nanoparticles.

6 Claims, 9 Drawing Sheets
(1 of 9 Drawing Sheet(s) Filed in Color)

(56) References Cited

U.S. PATENT DOCUMENTS

| | | | |
|---|---|---|---|
| 2012/0114089 A1* | 5/2012 | Potyrailo | G21C 17/022 |
| | | | 422/82.01 |
| 2013/0344588 A1* | 12/2013 | Halushka | C12Q 1/6804 |
| | | | 422/534 |
| 2017/0336398 A1* | 11/2017 | Lin | G01N 33/581 |
| 2022/0033880 A1* | 2/2022 | Sina | C12Q 1/6825 |

* cited by examiner

MODIFIED METAL NANOPARTICLE AND METHOD FOR MANUFACTURING THE SAME

BACKGROUND OF THE INVENTION

1. Field of the Invention

The present disclosure relates to a material for detecting a metal ion concentration, a method for manufacturing the same, a method and a device for detecting metal ion concentration, and more particularly, to a modified metal nanoparticle for detecting a manganese ion concentration, a method for manufacturing the same, a method and a concentration detection device for detecting the manganese ion concentration.

2. Description of the Prior Art

In the field of chemical analysis, flame atomic absorption spectrometry is widely used for quantitative determination of elements. When using the flame atomic absorption spectrometry, the sample to be analyzed is required to be prepared in the form of liquid solution. Then the liquid solution is sprayed and sent by a carrier gas into a flame for atomization. The characteristic light generated by a cathode lamp or an electrodeless discharge lamp is absorbed by a specific metal element which is atomized by the flame. The intensity of the specific wavelength is measured by the absorption spectrum and can be converted into a concentration of the specific metal element in the sample to be analyzed. Researches show that flame atomic absorption spectrometry can be used to determine over 70 different elements and can be applied to different fields, such as qualitative determination of element in the environment, quantitative determination of trace elements in a biological tissue and quantitative determination of metal elements in market products.

However, the apparatus of the flame atomic absorption spectrometry is expensive and bulky. Accordingly, it is unfavorable to reduce the measurement cost, and is unfavorable for quick detection and being carried to different locations for field measurement.

SUMMARY OF THE INVENTION

According to one embodiment of the present disclosure, a method for manufacturing modified metal nanoparticles is provided. The method for manufacturing the modified metal nanoparticles includes steps as follows. Metal nanoparticles are provided, wherein each of the metal nanoparticles is a gold (Au) nanoparticle or a silver (Ag) nanoparticle. An ascorbic acid solution is provided, wherein the ascorbic acid solution includes ascorbic acid molecules and/or ascorbic acid ions (hereinafter, ascorbic acid molecules and/or ions). A surface modification step is conducted, wherein the metal nanoparticles and the ascorbic acid solution are mixed, such that surfaces of the metal nanoparticles are modified by the ascorbic acid molecules and/or ions to obtain the modified metal nanoparticles.

According to another embodiment of the present disclosure, a modified metal nanoparticle is provided. The modified metal nanoparticle is manufactured by the aforementioned method.

According to yet another embodiment of the present disclosure, a method for detecting a manganese ion concentration applied to an analyte solution is provided. The method for detecting the manganese ion concentration includes steps as follows. A detecting composition is provided, wherein the detecting composition includes the aforementioned modified metal nanoparticle. A color card set is provided, wherein the color card set includes a plurality of color cards with different colors, each of the color cards corresponds to a manganese ion concentration value. A mixing step is conducted, wherein the detecting composition and the analyte solution are mixed to obtain a mixing solution. A colorimetry step is conducted, wherein a color of the mixing solution is compared with the colors of the color cards, the color card with the color which is the same or closest to the color of the mixing solution is chosen as a selected card, the manganese ion concentration value corresponding to the selected card is regarded as a first detecting value of the mixing solution, and a first measuring value of the manganese ion concentration of the analyte solution is calculated according to a mixing ratio of the detecting composition and the analyte solution.

According to yet another embodiment of the present disclosure, a method for detecting a manganese ion concentration applied to an analyte solution is provided. The method for detecting the manganese ion concentration includes steps as follows. An electrochemical step is conducted, wherein the analyte solution undergoes an electrochemical reaction, so as to obtain a current peak value of the analyte solution in a potential interval. A calculation step is conducted, wherein the current peak value is brought into a linear regression equation established in advance to obtain a measuring value of the manganese ion concentration of the analyte solution.

According to yet another embodiment of the present disclosure, a concentration detection device applied to detect a manganese ion concentration of an analyte solution is provided. The concentration detection device includes a reaction unit, a processing unit and a user interface. The reaction unit is for allowing the analyte solution to undergo an electrochemical reaction. The processing unit is connected to the reaction unit, wherein the processing unit is for obtaining a current peak value of the analyte solution in a potential interval and bringing the current peak value into a linear regression equation established in advance to obtain a measuring value of the manganese ion concentration of the analyte solution. The user interface is connected to the processing unit for showing the measuring value of the manganese ion concentration of the analyte solution.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The patent or application file contains at least one drawing executed in color. Copies of this patent or patent application publication with color drawing(s) will be provided by Office upon request and payment of the necessary fee. The present disclosure can be more fully understood by reading the following detailed description of the embodiment, with reference made to the accompanying drawings as follows.

DETAILED DESCRIPTION

<Method for Manufacturing Modified Metal Nanoparticles>

Figure 1:
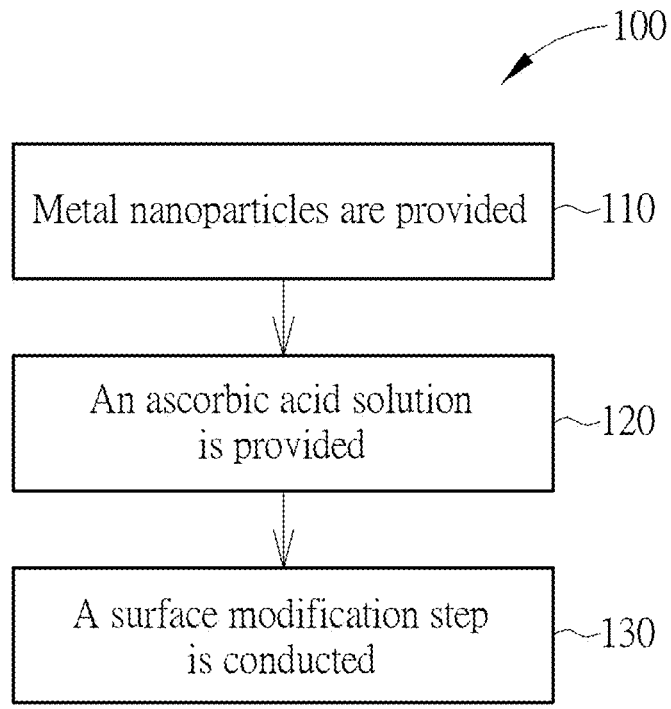
FIG. 1 is a flow diagram showing a method for manufacturing modified metal nanoparticles according to one embodiment of the present disclosure.

Please refer to FIG. 1, which is a flow diagram showing a method 100 for manufacturing modified metal nanoparticles according to one embodiment of the present disclosure. The method 100 includes Steps 110-130. In Step 110, metal nanoparticles are provided, wherein each of the metal nanoparticles is an Au nanoparticle or an Ag nanoparticle. The Au nanoparticles and Ag nanoparticles are featured with excellent surface plasmon resonance property and good molar absorption coefficient. When metal ions are introduced, the surface potential of the Au/Ag nanoparticles will be changed, which changes the charge distribution of the electric double layer. As a result, the Au/Ag nanoparticles agglomerate rapidly, whereby the color in the visible light range is changed. Therefore, it is favorable for visually detecting a metal ion concentration. A particle diameter of each of the metal nanoparticles can range from 5 nm to 30 nm. As such, the metal nanoparticles are featured with good dispersibility, which can prevent self-agglomeration.

Figure 2:
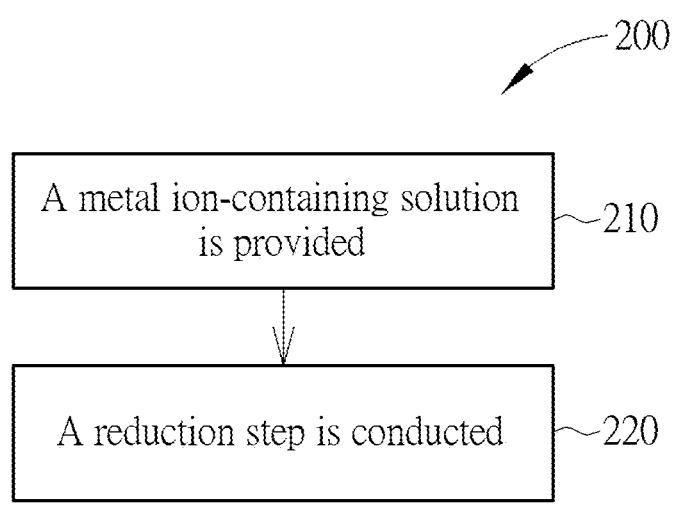
FIG. 2 is a flow diagram showing a method for manufacturing metal nanoparticles according to one embodiment of the present disclosure.

The metal nanoparticles can be manufactured by a chemical reduction method. Please refer to FIG. 2, which is a flow diagram showing a method 200 for manufacturing the metal nanoparticles according to one embodiment of the present disclosure. The method 200 can includes Step 210 and Step 220. In Step 210, a metal ion-containing solution is provided, wherein the metal ion-containing solution includes metal ions, each of the metal ions is an Au ion or an Ag ion. In Step 220, a reduction step is conducted, wherein a reductant is added into the metal ion-containing solution to reduce the metal ions, so as to obtain the metal nanoparticles. Compared with a metal vapor synthesis method and a laser ablation method, it is beneficial to reduce costs and mass production by using the chemical reduction method to manufacture the metal particles.

For example, when the metal nanoparticle is the Au nanoparticle, the metal ion-containing solution can be a chloroauric acid ($HAuCl_4$) aqueous solution, a concentration of the $HAuCl_4$ aqueous solution can range from 0.0001 M to 0.1 M. The reductant can be sodium citrate, and a concentration of the sodium citrate in the $HAuCl_4$ aqueous solution can range from 0.0001 mM to 0.1 mM. The reduction step can be conducted at a temperature ranging from 70° C. to 130° C. for 10 minutes to 20 minutes. Preferably, the reduction step can be conducted at a temperature ranging from 90° C. to 120° C. for 15 minutes. However, the present disclosure is not limited thereto, the metal ion-containing solution and the reductant can be selected according to the desired metal nanoparticle, and the temperature and the time of the reduction step can be adjusted according to the selected metal ion-containing solution and the reductant.

The metal nanoparticles can be provided by a metal nanoparticle-containing solution. A concentration of the metal nanoparticles in the metal nanoparticle-containing solution can range from $5 \times 10^{-6}$ M to $5 \times 10^{-2}$ M. For example, when using the chemical reduction method to manufacture the metal nanoparticles, the metal nanoparticles reduced from the metal ions in the metal ion-containing solution are dispersed in the original solvent of the metal ion-containing solution. In other words, the product of the chemical reduction method can be directly used as the source of the metal nanoparticles in Step 110. As such, it is not required to separate the metal nanoparticles from the solvent of the metal ion-containing solution, which can simplify the process.

Please refer back to FIG. 1. In Step 120, an ascorbic acid ($C_6H_8O_6$) solution is provided, wherein the ascorbic acid solution includes ascorbic acid molecules and/or ions. The ascorbic acid solution can be an ascorbic acid aqueous solution, i.e., the ascorbic acid solution can be prepared by dissolving ascorbic acid with water. Specifically, the ascorbic acid is in solid state at room temperature and pressure. The ascorbic acid solution can be prepared by dissolving the solid ascorbic acid with solvent. The dissociation constant of the ascorbic acid depends on the solvent and the concentration. As such, the ascorbic acid in the ascorbic acid solution may be in a molecular state or dissociate state. Therefore, the ascorbic acid solution includes ascorbic acid molecules and/or ions. A concentration of the ascorbic acid molecules and/or ions in the ascorbic acid solution can range from 5 wt % to 15 wt %, which is favorable properly modifying the Au nanoparticles. Preferably, the concentration of the ascorbic acid molecules and/or ions in the metal nanoparticle-containing solution can range from 8 wt % to 12 wt %. The phrase "the concentration of the ascorbic acid molecules and/or ions" refers a sum of a concentration of the ascorbic acid molecules and a concentration of the ascorbic acid ions.

In Step 130, a surface modification step is conducted, wherein the metal nanoparticles and the ascorbic acid solution are mixed, such that surfaces of the metal nanoparticles are modified by the ascorbic acid molecules and/or ions to obtain the modified metal nanoparticles. When the metal nanoparticles are Au nanoparticles, the modified metal nanoparticles are modified Au nanoparticles. When the metal nanoparticles are Ag nanoparticles, the modified metal nanoparticles are modified Ag nanoparticles. When the metal nanoparticles are provided by the metal nanoparticle-containing solution, in Step 130, the metal nanoparticle-containing solution and the ascorbic acid solution are mixed, and a volume ratio of the metal nanoparticle-containing solution and the ascorbic acid solution can range from 1:0.8 to 1:1.2, which is favorable for increasing the ability for detecting manganese ion concentration and maintaining the visual recognition for colors.

With Step 130, a liquid detecting composition can be obtained. The detecting composition includes the modified metal nanoparticles. After being modified by the ascorbic acid molecules/ions, the interaction efficiency between the metal nanoparticles and the metal ions can be enhanced, such that the time required for the agglomeration of the modified metal nanoparticles and the metal ions can be reduced. Furthermore, different metal ion concentrations result in different agglomeration degrees so as to present different colors, which can realize quickly detecting metal ion concentration by colorimetry and visually detecting metal ion concentration. Take the modified metal nanoparticles being modified Au nanoparticles and the metal ions being the manganese ions as example. When the modified Au nanoparticles interact with the manganese ions, the color will gradually deepen, such as from ruby red to dark red or purple. The depth of color depends on the manganese ion concentration and the reaction time. As such, the detecting composition according to the present disclosure can be applied to detect the manganese ion concentration. However, the present disclosure is not limited thereto. The detecting composition can also be applied to detecting the concentration of alkali metal ions or alkaline earth metal ions. Specifically, metal ions with charges on surfaces thereof can be detected by the detecting composition according to the present disclosure.

Figure 10:
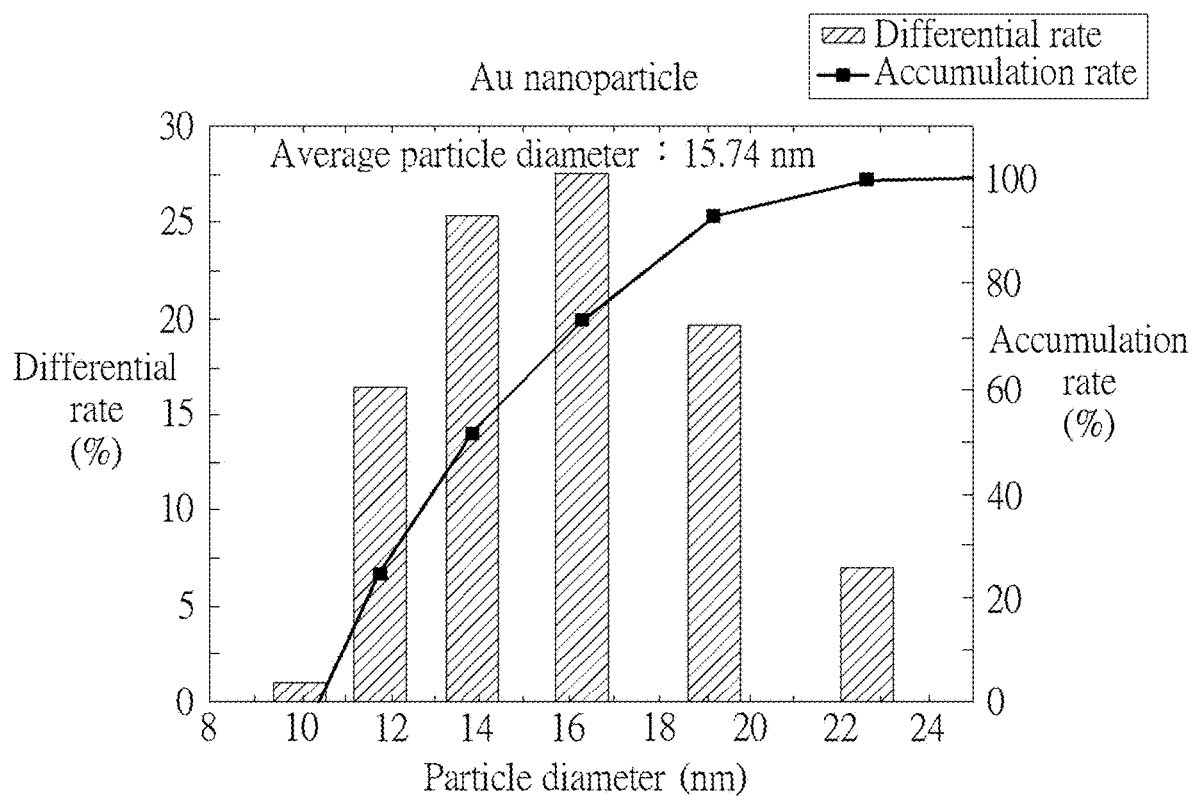
FIG. 10 is a diagram showing particle diameter distribution of Au nanoparticles according to one example of the present disclosure.
Figure 11:
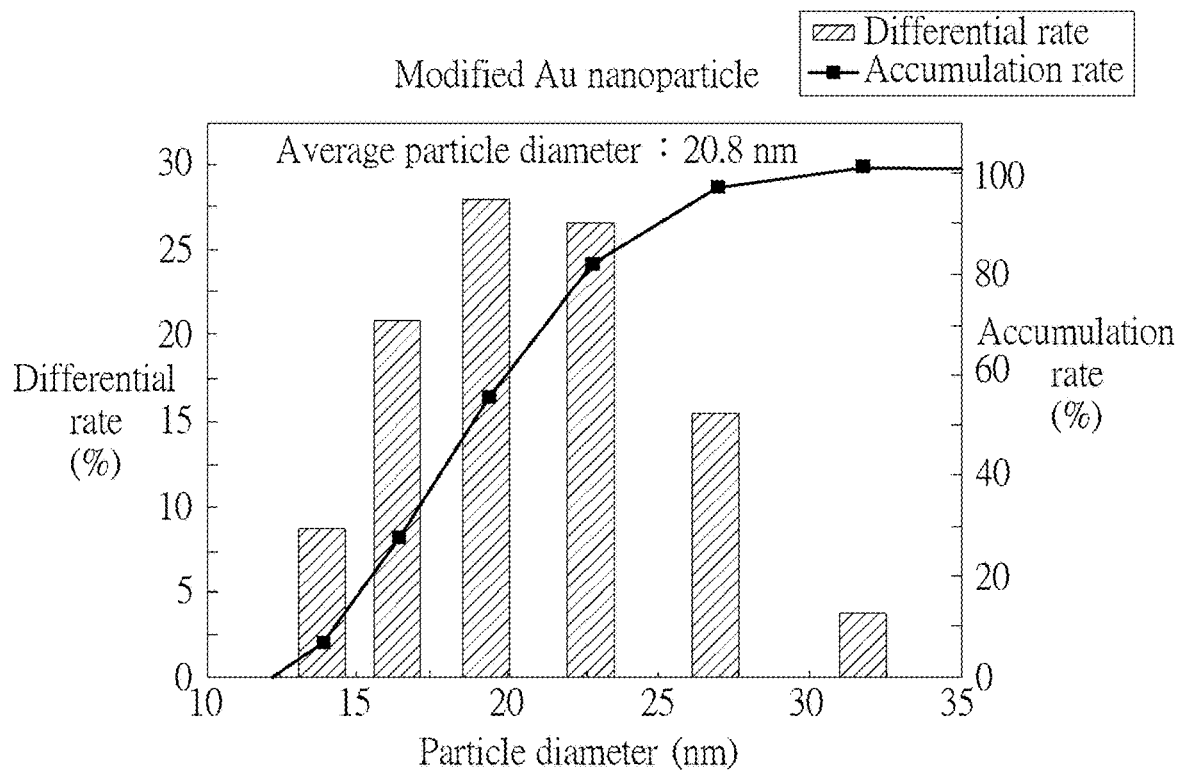
FIG. 11 is a diagram showing particle diameter distribution of modified Au nanoparticles according to one example of the present disclosure.
Figure 12:
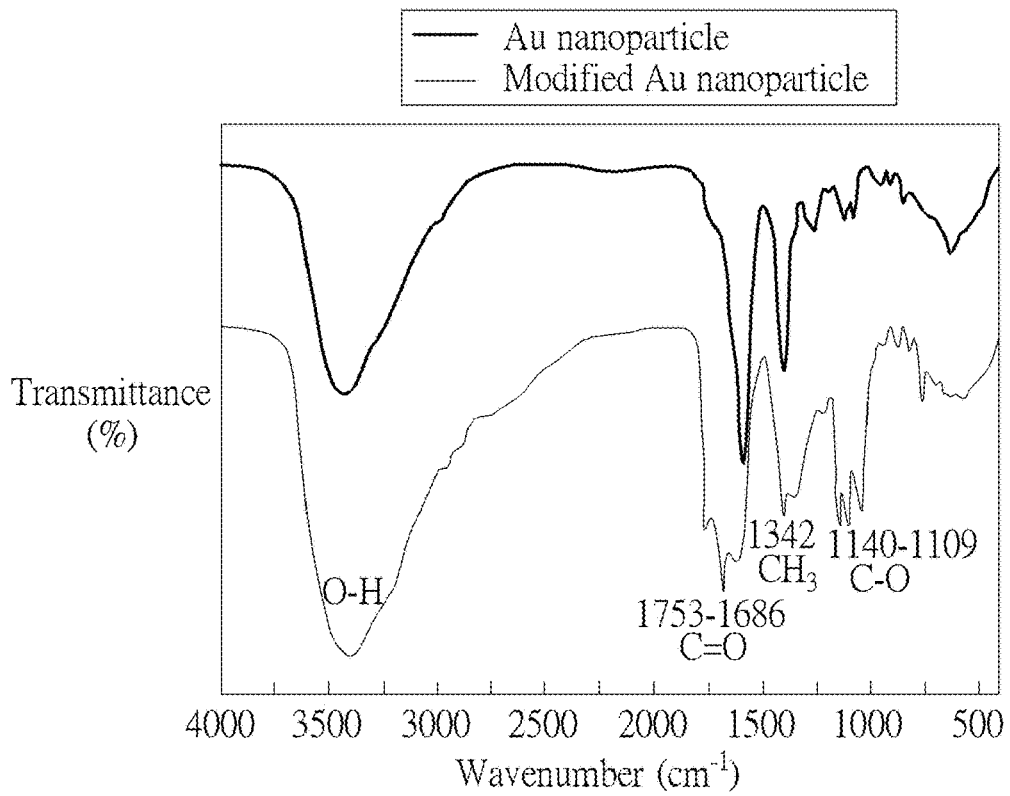
FIG. 12 is an infrared spectrum of the Au nanoparticles of FIG. 10 and the modified Au nanoparticles of FIG. 11.

Please refer to FIG. 10 to FIG. 12. FIG. 10 is a diagram showing particle diameter distribution of Au nanoparticles according to one example of the present disclosure. FIG. 11 is a diagram showing particle diameter distribution of modified Au nanoparticles according to one example of the present disclosure. FIG. 12 is an infrared spectrum of the Au nanoparticles of FIG. 10 and the modified Au nanoparticles of FIG. 11. In the example, the Au nanoparticles are manufactured as follows. A $HAuCl_4$ aqueous solution of 0.5 mM is prepared. The $HAuCl_4$ aqueous solution is heated and maintained at a temperature ranging from 90° C. to 120° C. for 15 minutes to increase the dissolution uniformity. Sodium citrate of 0.03 g is added in the $HAuCl_4$ aqueous solution to form a reaction solution. A concentration of the sodium citrate in the reaction solution is 5.7 mM. The reaction solution is heated and maintained at a temperature ranging from 90° C. to 120° C. for 15 minutes, and let the reaction solution cool to the room temperature naturally. As such, an Au nanoparticle-containing solution is obtained, wherein a concentration of the Au nanoparticles in the Au nanoparticle-containing solution is $5×10^{-4}$ M. The Au nanoparticle-containing solution is subjected to a particle diameter analysis (Dynamic Light Scattering: Beckman Coulter/ Delsa™ NaNO C), and the result is shown in FIG. 10.

The modified Au nanoparticles are manufactured as follows. An ascorbic acid aqueous solution of 8-12 wt % is provided. The Au nanoparticle-containing solution and the ascorbic acid aqueous solution are mixed in a volume ratio of 1:1 to obtain a modified Au nanoparticle-containing solution. The modified Au nanoparticle-containing solution is subjected to the particle diameter analysis and infrared spectroscopy analysis, and results are shown in FIG. 11 and FIG. 12.

In FIG. 10, particle diameters of the Au nanoparticles are in the range of 8 nm to 24 nm, and an average particle diameter is 15.74 nm. In FIG. 11, particle diameters of the modified Au nanoparticles are in the range of 10 nm to 35 nm, and an average particle diameter is 20.8 nm. The average particle diameter of the modified Au nanoparticles is greater than that of the Au nanoparticles, which shows the ascorbic acid molecules and/or ions indeed attach to the surfaces of the Au nanoparticles. In FIG. 12, the transmittances of carbon-hydrogen bond ($CH_3$) and carbon-oxygen bonds (C—O, C=O) of the modified Au nanoparticles are enhanced significantly, which shows the ascorbic acid molecules and/or ions indeed attach to surfaces of the Au nanoparticles.

<Method for Detecting Manganese Ion Concentration>

Figure 3:
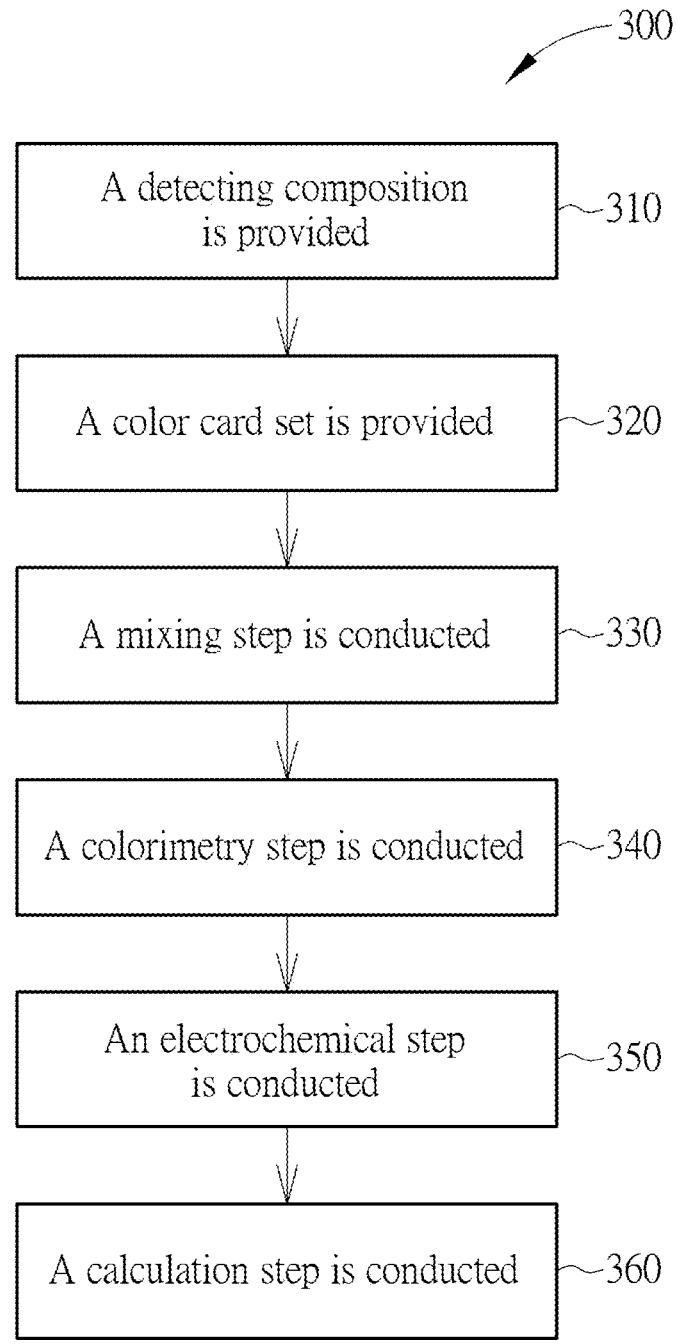
FIG. 3 is a flow diagram showing a method for detecting a manganese ion concentration according to one embodiment of the present disclosure.

FIG. 3 is a flow diagram showing a method 300 for detecting a manganese ion concentration according to one embodiment of the present disclosure. The method 300 is for detecting a manganese ion concentration of an analyte solution (i.e., a solution to be analyzed). The method 300 includes Steps 310-340, and can selectively include Steps 350-360.

In Step 310, a detecting composition is provided, wherein the detecting composition includes the modified metal nanoparticle. Details of the modified metal nanoparticle can refer to the above description and are not repeated herein. In Step 320, a color card set is provided, wherein the color card set includes a plurality of color cards with different colors, each of the color cards corresponds to a manganese ion concentration value. In Step 330, a mixing step is conducted, wherein the detecting composition and the analyte solution are mixed to obtain a mixing solution. A volume ratio of the detecting composition and the analyte solution can range from 150:1 to 50:1. Preferably, the volume ratio of the detecting composition and the analyte solution can be 100:1. In Step 340, a colorimetry step is conducted, wherein a color of the mixing solution is compared with the colors of the color cards, the color card with the color which is the same or closest to the color of the mixing solution is chosen as a selected card, the manganese ion concentration value corresponding to the selected card is regarded as a first detecting value of the mixing solution, and a first measuring value of the manganese ion concentration of the analyte solution is calculated according to a mixing ratio (such as the volume ratio) of the detecting composition and the analyte solution. The color of the mixing solution also depends on the reaction time of the detecting composition and the analyte solution. According to one embodiment, the colorimetry step is finished within a predetermined time after obtaining the mixing solution. The predetermined time can be regarded as the reaction time of the detecting composition and the analyte solution, i.e., the predetermined time can be calculated from the moment at which the detecting composition and the analyte solution are mixed. The predetermined time can be, but is not limited to, 5 seconds. As such, the method 300 can achieve quick detection.

Figure 6:
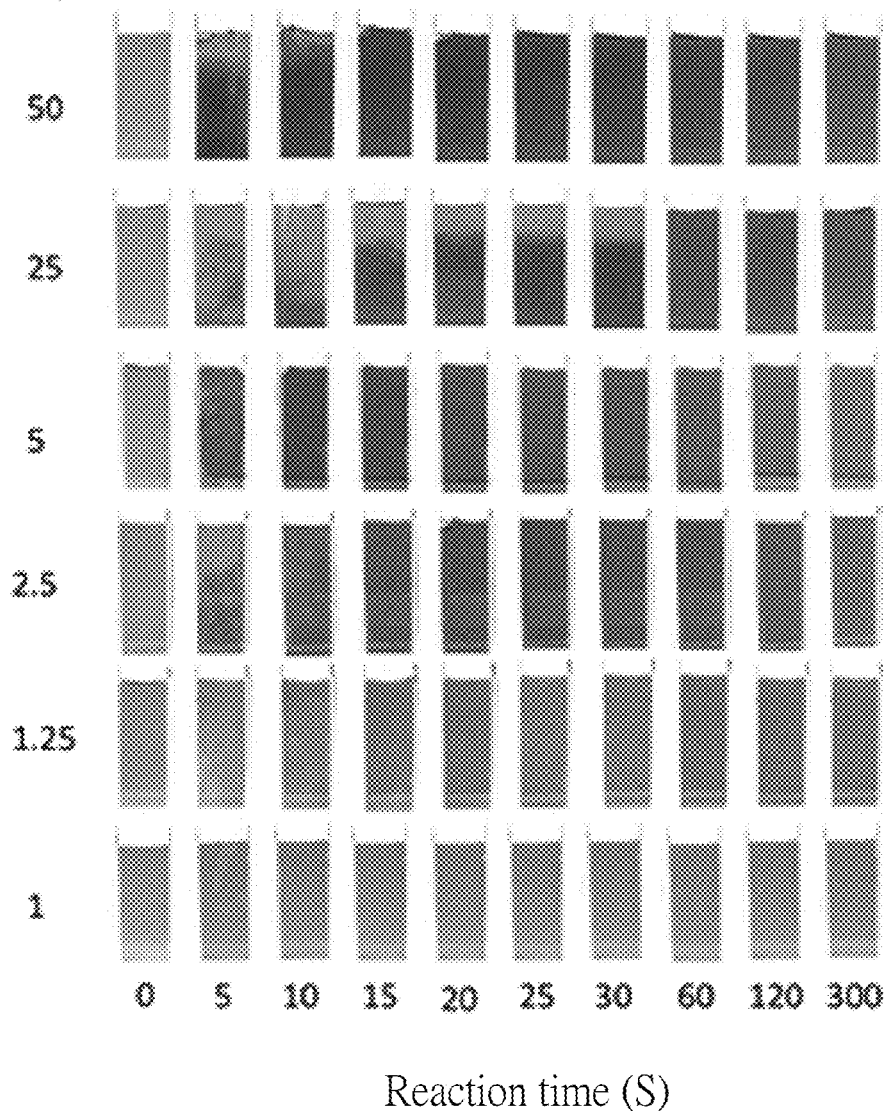
FIG. 6 is a photograph showing a color card set according to one embodiment of the present disclosure.

Please refer to FIG. 6, which is a photograph showing the color card set according to one embodiment of the present disclosure. The color card set includes a plurality of color cards with different colors. Each of the color cards corresponds to a manganese ion concentration value and a reaction time. The color card set is prepared in advance. First, a plurality of reference solutions containing manganese ions are provided, each of the reference solutions has a reference manganese ion concentration, and the reference manganese ion concentrations of the reference solutions are different and known. The reference solutions are respectively mixed with the detecting composition to form reference mixing solutions, the colors of the reference mixing solutions at different reaction times are recorded (by taking photos or videos) and the color cards presented the colors of the reference mixing solutions are made, so as to obtain the color card set of FIG. 6. As shown in FIG. 6, when the concentration of the manganese ion is greater or the reaction time is longer, the color of the color card is deeper. Therefore, when conducting the colorimetry step, the reaction time should be recorded, and the color of the mixing solution is compared with the colors of the color cards with the same reaction time. For example, if the reaction time is 5 seconds, the color cards in the column of 5 seconds (S) are selected to be compared with the color of the mixing solution.

According to above description, the method 300 uses the modified metal particles as the component of the detecting composition, when the modified metal particles are mixed with the analyte solution with different manganese ion concentrations, different colors will be presented, which can realize quickly detecting the manganese ion concentration by colorimetry.

Please refer back to FIG. 3. The method 300 can further include Steps 350 and 360. In Step 350, an electrochemical step is conducted, wherein the mixing solution undergoes an electrochemical reaction, so as to obtain a current peak value of the mixing solution in a potential interval. Specifically, the electrochemical step can be based on differential pulse voltammetry. That is, the potential is swept linearly while a pulse is applied in the potential interval, such that a current versus potential curve of the mixing solution is obtained, and a current peak value can be obtained from the current versus potential curve. The potential interval can range from 0 V to 1.5 V. According to one example, the amount of the mixing solution can range from 10 μL to 300 μL. Preferably, the amount of the mixing solution can range from 30 μL to 50 μL, such as 40 μL. Moreover, the time required by Step 350 is less than 60 seconds. In other words, when conducting the electrochemical step, only trace amount of the solution (herein, the mixing solution) is required, and the detection can be completed in a short time, which is favorable for trace amount detection and quick detection.

In Step 360, a calculation step is conducted, wherein the current peak value is brought into a linear regression equation established in advance to obtain a second detecting value of the mixing solution, and a second measuring value of the manganese ion concentration of the analyte solution is calculated according to the mixing ratio of the detecting composition and the analyte solution. The second measuring value and the first measuring value may be the same or different.

According to the above description, the method 300 can only conduct Steps 310-340. That is, the method 300 detects the manganese ion concentration by colorimetry, which can achieve quick detection and is not required to rely on specific apparatus (which is different from flame atomic absorption spectrometry), and can determine by naked eyes, which is favorable for field measurement. The method 300 can further conduct Steps 350-360. That is, the method 300 adopts two-stage detection. In the first stage, the manganese ion concentration is detected by colorimetry. In the second stage, the manganese ion concentration is detected by electrochemical method. The electrochemical method is featured with higher sensitivity and lower detection limitation, which can compensate the short of the colorimetry, and can achieve trace amount detection and quick detection at the same time.

Figure 4:
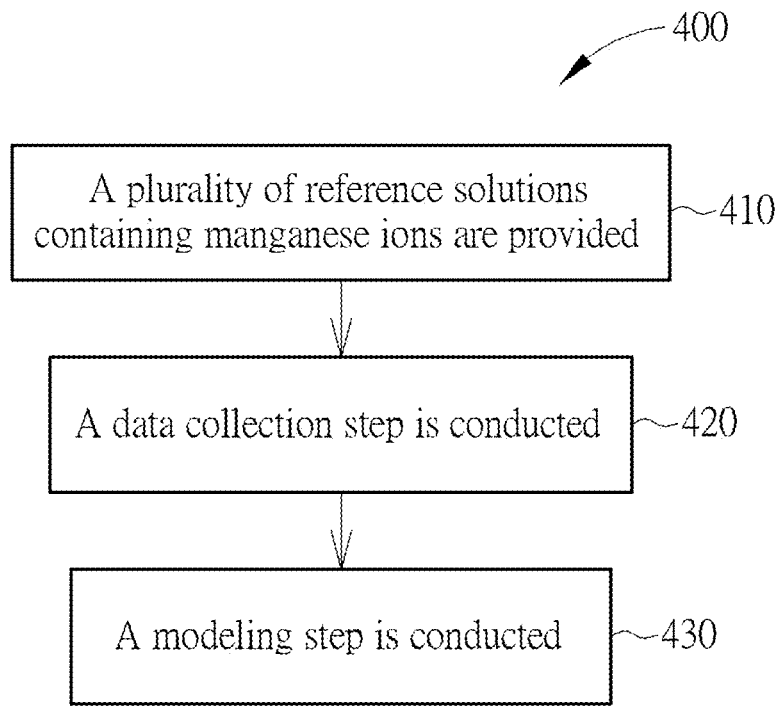
FIG. 4 is a flow diagram showing a method for establishing a linear regression equation according to one embodiment of the present disclosure.

Please refer to FIG. 4, which is a flow diagram showing a method 400 for establishing the linear regression equation according to one embodiment of the present disclosure. The method 400 can includes Steps 410-430. In Step 410, a plurality of reference solutions containing manganese ions are provided, wherein each of the reference solutions has a reference manganese ion concentration, and the reference manganese ion concentrations of the reference solutions are different and known. In Step 420, a data collection step is conducted, wherein each of the reference solutions undergoes the electrochemical reaction, so as to obtain a reference current peak value of each of the reference solutions in the potential interval. Specifically, Step 420 adopts the differential pulse voltammetry to obtain the current versus potential curve of each of the reference solutions, and to obtain the reference current peak value from the current versus potential curve. In Step 430, a modeling step is conducted, wherein the reference manganese ion concentrations and the reference current peak values are modeled via linear regression to obtain the linear regression equation.

Figure 13A:
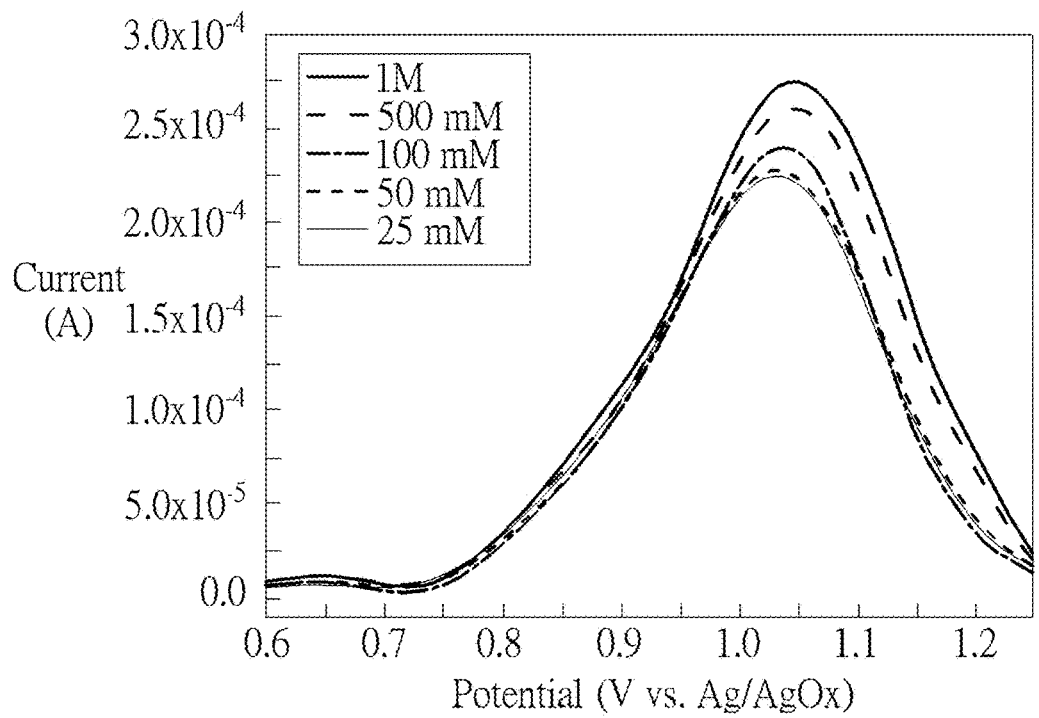
FIG. 13A shows current versus potential curves of a plurality of reference solutions containing manganese ions according to one example of the present disclosure.
Figure 13B:
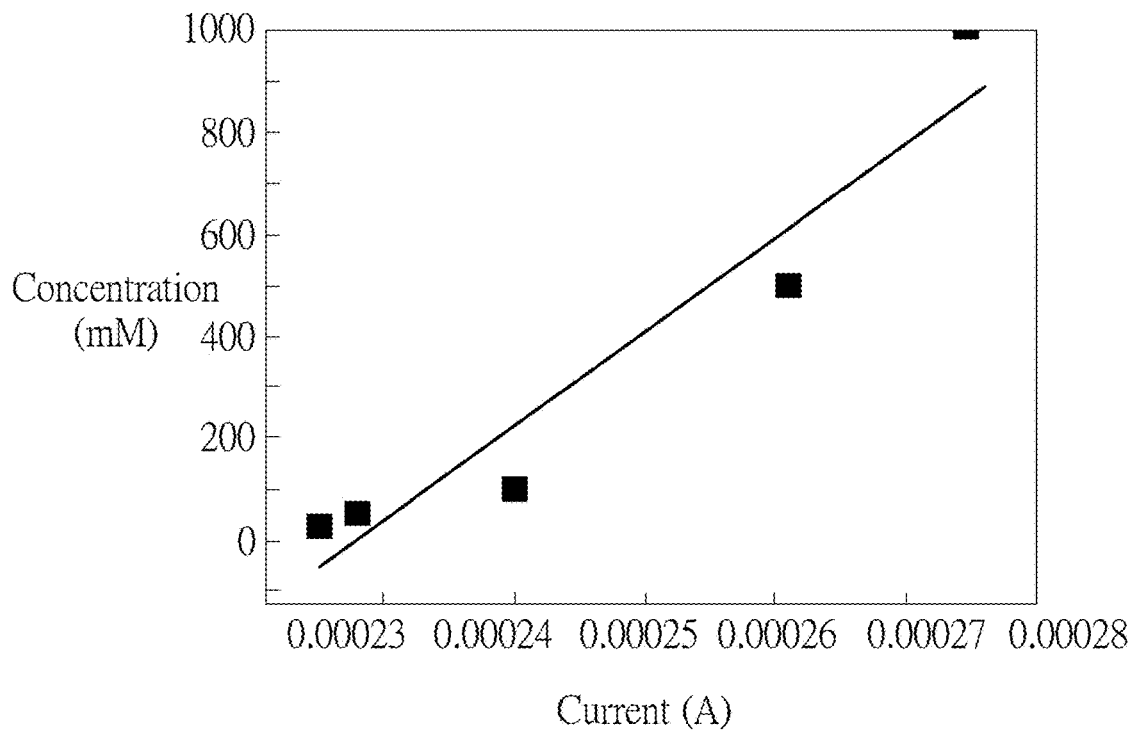
FIG. 13B shows a modeling result of linear regression between current peak values and reference manganese ion concentrations of FIG. 13A.

Please refer to FIG. 13A and FIG. 13B. FIG. 13A shows current versus potential curves of a plurality of reference solutions containing manganese ions according to one example of the present disclosure. FIG. 13B shows a modeling result of linear regression between current peak values and reference manganese ion concentrations of FIG. 13A. In FIG. 13B, the current peak value is simplified as current, and the reference manganese ion concentration is simplified as concentration. Further, the current peak value of the reference solution is also called as the reference current peak value. In FIG. 13A, five reference solutions containing manganese ions are provided. The potential interval ranges from 0.6 V to 1.25 V. The current peak value refers to the current value of the vertex of the current versus potential curve. The reference manganese ion concentrations and current peak values in FIG. 13A are shown in Table 1, wherein 1000 mM=1 M.

TABLE 1

| reference manganese ion concentration (mM) | 25 | 50 | 100 | 500 | 1000 |
|---|---|---|---|---|---|
| current peak value (A) | 2.25E−4 | 2.28E−4 | 2.4E−4 | 2.61E−4 | 2.76E−4 |

The data in Table 1 are modeled via linear regression to obtain the linear regression equation (1):

$$y = 1.8419\ E+7\ x - 4196.07477 \quad (1);$$

In the linear regression equation (1), coefficient of determination $R^2=0.9308$; y represents the manganese ion concentration, the unit is mM; x represents the current peak value, the unit is A. According to the $R^2$ of FIG. 13B, it shows that the manganese ion concentration has a good linear relationship with the current peak value. Therefore, the method for detecting the manganese ion concentration according to the present disclosure can accurately detect the manganese ion concentration of the mixed solution/analyte solution. Further, the linear regression equation (1) is verified by a plurality of manganese ion-containing solutions. The concentrations of the manganese ion-containing solutions are known and in the range of 25 mM to 1000 mM. Specifically, the current peak value of each of the manganese ion-containing solutions is obtained via the electrochemical step. The current peak value of each of the manganese ion-containing solutions is brought into the linear regression equation (1) to obtain a measuring value of the manganese ion concentration of each of the manganese ion-containing solutions. The error between the measuring value and the actual concentration (known concentration) is calculated. The errors of the manganese ion-containing solutions are all within the range of ±2.40%, which shows that using the electrochemical method to detect the manganese ion concentration has good accuracy.

Figure 14A:
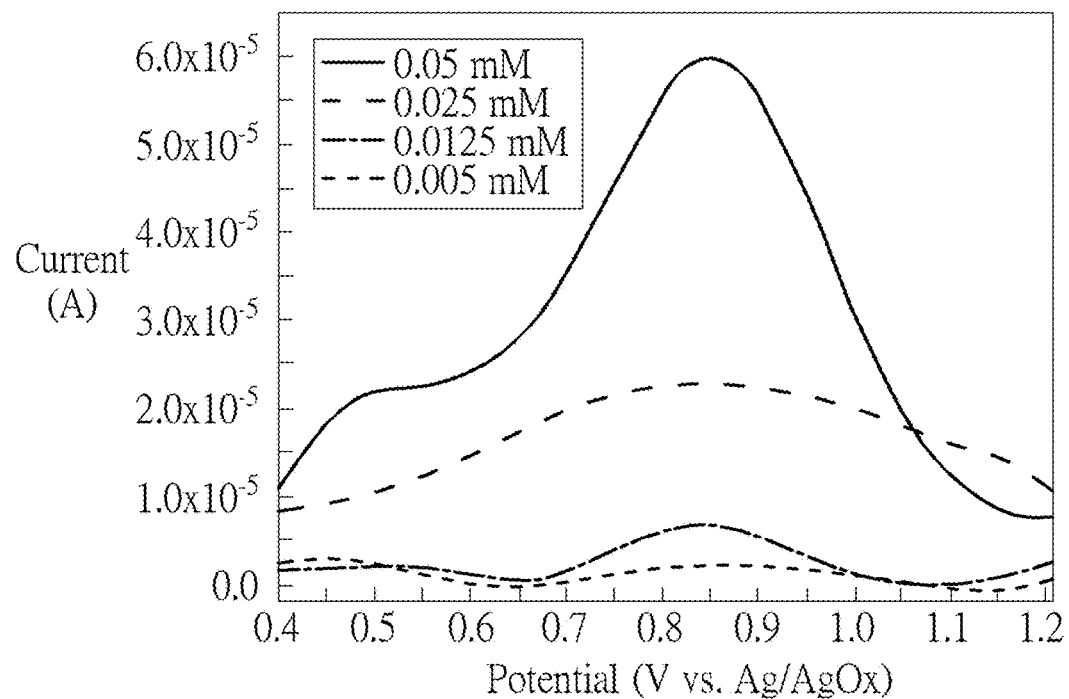
FIG. 14A shows current versus potential curves of a plurality of reference solutions containing manganese ions according to another example of the present disclosure.
Figure 14B:
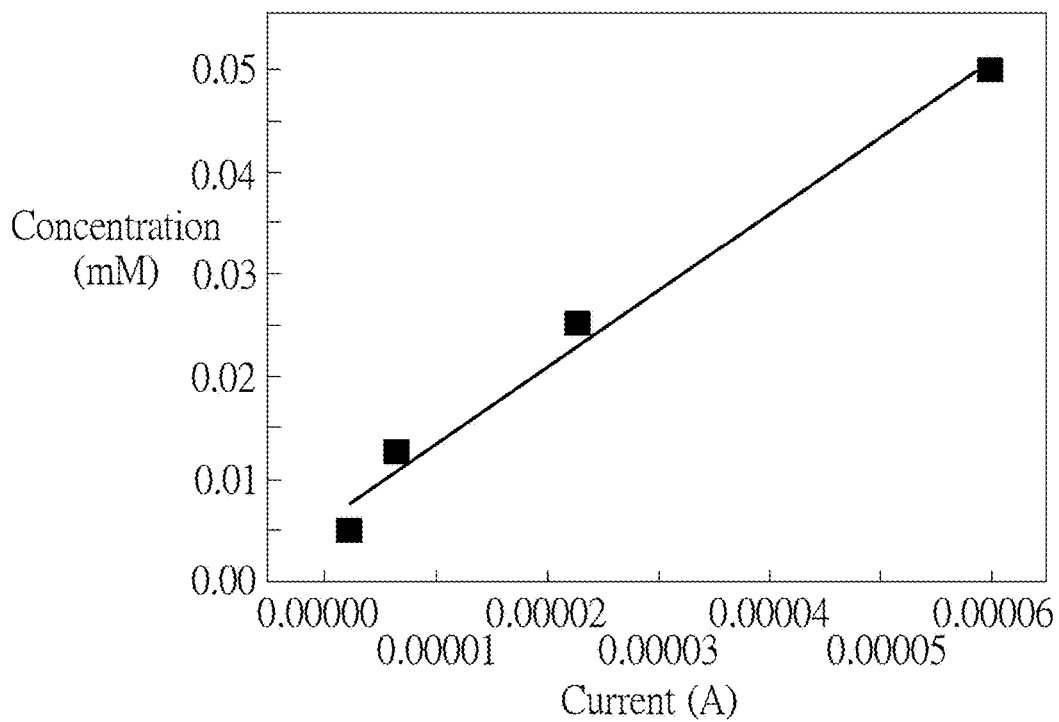
FIG. 14B shows a modeling result of linear regression between current peak values and reference manganese ion concentrations of FIG. 14A.

Please refer to FIG. 14A and FIG. 14B. FIG. 14A shows current versus potential curves of a plurality of reference solutions containing manganese ions according to another example of the present disclosure. FIG. 14B shows a modeling result of linear regression between current peak values and reference manganese ion concentrations of FIG. 14A. In FIG. 14B, the current peak value is simplified as current, and the reference manganese ion concentration is simplified as concentration. Further, the current peak value of the reference solution is also called as the reference current peak value. The reference manganese ion concentrations and current peak values of the four reference solutions containing manganese ions in FIG. 14A are shown in Table 2.

TABLE 2

| reference manganese ion concentration (mM) | 0.005 | 0.0125 | 0.025 | 0.05 |
|---|---|---|---|---|
| current peak value (A) | 2.185E-6 | 6.56E-6 | 2.277E-5 | 5.98E-5 |

The data in Table 2 are modeled via linear regression to obtain the linear regression equation (2):

$$y=748.65412x+0.00603 \quad (2);$$

In the linear regression equation (2), the coefficient of determination $R^2=0.9881$; y represents the manganese ion concentration, the unit is mM; x represents the current peak value, the unit is A. According to the $R^2$ of FIG. 14B, it shows that the manganese ion concentration has a good linear relationship with the current peak value. Therefore, the method for detecting the manganese ion concentration according to the present disclosure can accurately detect the manganese ion concentration of the mixed solution/analyte solution. Further, the linear regression equation (2) is verified by a plurality of manganese ion-containing solutions. The concentrations of the manganese ion-containing solutions are known and in the range of 0.005 mM to 0.05 mM. Specifically, the current peak value of each of the manganese ion-containing solutions is obtained via the electrochemical step. The current peak value of each of the manganese ion-containing solutions is brought into the linear regression equation (2) to obtain a measuring value of the manganese ion concentration of each of the manganese ion-containing solutions. The error between the measuring value and the actual concentration (known concentration) is calculated. The errors of the manganese ion-containing solutions are all within the range of ±1.62%, which shows that using the electrochemical method to detect the manganese ion concentration has good accuracy.

As shown in FIG. 13A to FIG. 14B, different linear regression equations can be established for different ranges of reference manganese ion concentration. When conduct Step 350, a current peak value of the mixing solution can be obtained, and a proper linear regression equation can be selected according to the current peak value. For example, when the current peak value of the mixing solution is in the range of 2.25 E-4 to 2.76 E-4, the linear regression equation (1) is selected to calculate and obtain the second measuring value of the manganese ion concentration.

Figure 5:
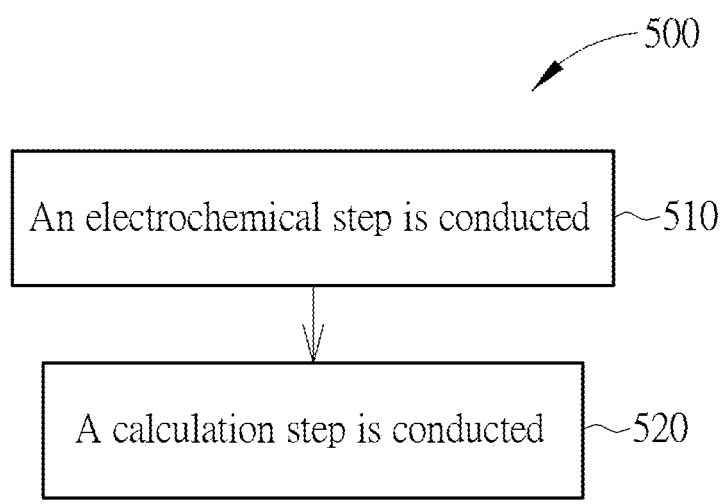
FIG. 5 is a flow diagram showing a method for detecting a manganese ion concentration according to another embodiment of the present disclosure.

Please refer to FIG. 5, which is a flow diagram showing a method 500 for detecting a manganese ion concentration according to another embodiment of the present disclosure. The method 500 is for detecting a manganese ion concentration of an analyte solution. The method 500 can include Step 510 and Step 520. In Step 510, an electrochemical step is conducted, wherein the analyte solution undergoes an electrochemical reaction, so as to obtain a current peak value of the analyte solution in a potential interval. In Step 520, a calculation step is conducted, wherein the current peak value is brought into a linear regression equation established in advance to obtain a measuring value of the manganese ion concentration of the analyte solution. In Step 510, the amount of the analyte solution can range from 10 µL to 300 µL. Preferably, the amount of the analyte solution can range from 30 µL to 50 µL, such as 40 µL. Details of Step 510 can refer to Step 350, details of Step 520 can refer to Step 360, both of which are not repeated herein.

Specifically, the difference between Steps 350-360 and Steps 510-520 are the subject conducted with the electrochemical step. In Steps 350-360, it is the mixing solution formed by the detecting composition and the analyte solution undergoing the electrochemical reaction; in Steps 510-520, it is the analyte solution undergoing the electrochemical reaction. The current peak value is a current value corresponding to a reduction peak potential of the metal ion to be detected (herein, the manganese ion), the reduction peak potential only relevant to the metal ion to be detected, and is irrelevant to other components in the detecting composition, such as the metal nanoparticles. Therefore, when conducting the electrochemical step, the reduction peak potential is not affected by adding the detecting composition. In other words, the method 500 can be applied to directly detect the manganese ion concentration of the analyte solution.

<Concentration Detection Device>

Figure 7:
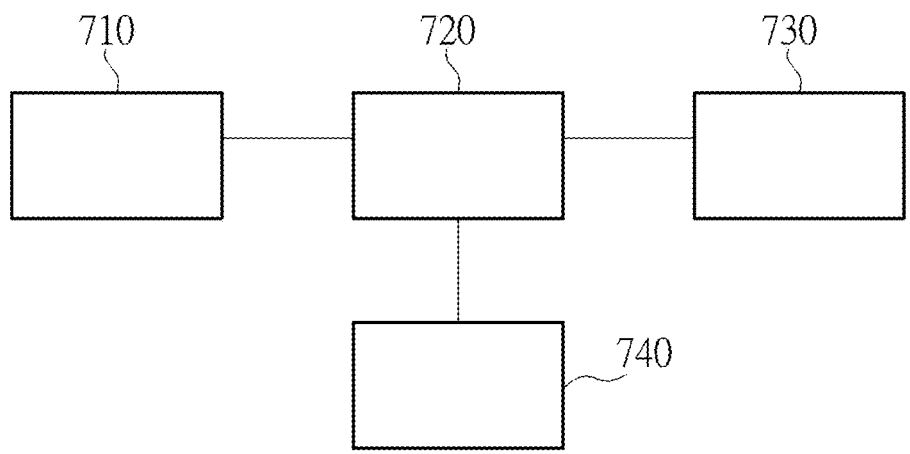
FIG. 7 is a functional block diagram of a concentration detection device according to one embodiment of the present disclosure.

Please refer to FIG. 7, which is a functional block diagram of a concentration detection device 700 according to one embodiment of the present disclosure. The concentration detection device 700 is applied to detect a manganese ion concentration of an analyte solution. The concentration detection device 700 includes a reaction unit 710, a processing unit 720, a user interface 730, and can selectively include a storage unit 740. The reaction unit 710 is for allowing the analyte solution to undergo an electrochemical reaction. The processing unit 720 is connected to the reaction unit 710, wherein the processing unit 720 is for obtaining a current peak value of the analyte solution in a potential interval and bringing the current peak value into a linear regression equation established in advance to obtain a measuring value of the manganese ion concentration of the analyte solution. Specifically, it can adopt the differential pulse voltammetry to cause the analyte solution to undergo the electrochemical reaction in the reaction unit 710. Then the processing unit 720 collects the current values and potential values during the electrochemical reaction to obtain the current versus potential curve of the analyte solution in the potential interval.

Figure 8:
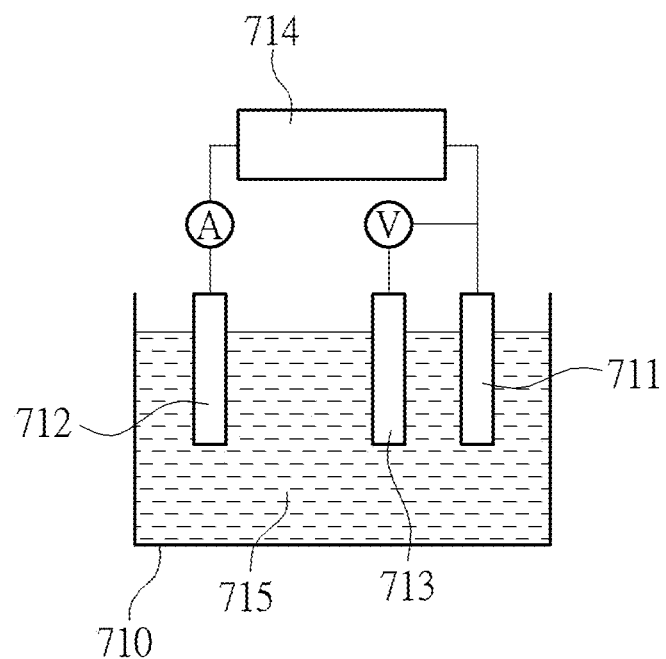
FIG. 8 is a schematic diagram showing a reaction unit according to one embodiment of the present disclosure.

Please refer to FIG. 8, which is a schematic diagram showing the reaction unit 710 according to one embodiment of the present disclosure. In FIG. 8, the reaction unit 710 is a three-electrode system, which includes a working electrode 711, an auxiliary electrode 712 and a reference electrode 713. The working electrode 711, the auxiliary electrode 712 and the reference electrode 713 are electrically connected to each other and are in contact with the analyte solution 715, such that the analyte solution 715 is allowed to undergo the electrochemical reaction under power supply condition. In the embodiment, the reaction unit 710 can further include a power source 714 electrically connected to the working electrode 711, the auxiliary electrode 712 and the reference electrode 713 for providing the power required by the electrochemical reaction. The material of the working electrode 711 can be, but is not limited to, carbon. The material of the auxiliary electrode 712 can be, but is limited to, carbon. The material of the reference electrode 713 can be, but is not limited to, silver/silver oxide. In addition to providing power, the power source 714 may include other functions, such as measuring potential, current, and other data required to draw the current versus potential curve. The power source 714 can be, but not limited to, a commercially available electrochemical analyzer or electrochemical workstation.

The processing unit 720 has a calculation function. For example, the processing unit 720 can be, but not limited to, a central processing unit (CPU). The user interface 730 is connected to the processing unit 720. The user interface 730 is for showing the measuring value of the manganese ion concentration of the analyte solution. Preferably, the user interface 730 is capable of allowing the user to input instructions. For example, the instructions can be the parameters of the electrochemical reaction, such as the sweeping potential interval, sweeping rate, etc. The user interface 730 can include a screen, a mouse, and a keyboard. When the screen is a touch screen, the user interface 730 can only include the screen. The storage unit 740 is connected to the processing unit 720, and the storage unit 740 is for providing a storage function, such as storing linear regression equations or measuring results. The storage unit 740 can be, but is not limited to, a random access memory (RAM) or read-only storage memory (ROM). In addition, the aforementioned "connection" can refer to a wired connection or a wireless connection.

Figure 9:
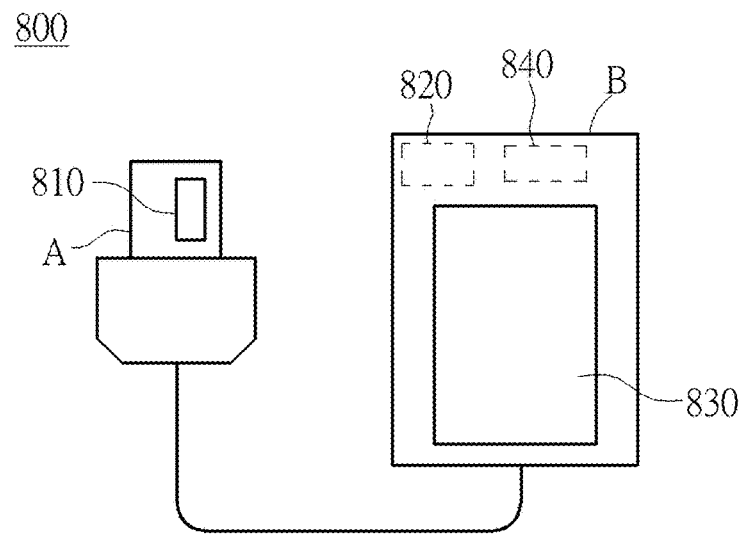
FIG. 9 is a schematic diagram showing a concentration detection device according to one embodiment of the present disclosure.

Please refer to FIG. 9, which is a schematic diagram showing a concentration detection device 800 according to one embodiment of the present disclosure. The concentration detection device 800 include a detection part A and a main body B. The detection part A is connected to the main body B. The detection part A includes a reaction unit 810, which can be a three-electrode system made by screen printing. When detecting the manganese ion concentration of the analyte solution, it only requires dropping the analyte solution on the reaction unit 810.

The main body B includes a processing unit 820, a storage unit 840 and a user interface 830. The processing unit 820 and the storage unit 840 are disposed inside the main body B. The user interface 830 is a touch screen. Details of the reaction unit 810, the processing unit 820, the user interface 830 and the storage unit 840 can refer to the description related the elements with the same names in FIG. 7 and FIG. 8, and are not repeated herein. The size of the concentration detection device 800 in FIG. 9 can be a portable size, such that the concentration detection device 800 has advantages of lightweight and easy to carry. Furthermore, compared to the apparatus of the flame atomic absorption spectrometry, the cost of the concentration detection device 800 is lower.

Compared to the prior art, the modified metal nanoparticles are modified by ascorbic acid, the interaction efficiency between the metal nanoparticles and the metal ions can be enhanced, such that the time required for the agglomeration of the modified metal nanoparticles and the metal ions can be reduced. Different metal ion concentrations result in different agglomeration degrees so as to present different colors, which can realize quickly detecting metal ion concentration by colorimetry. Furthermore, the method for detecting manganese ion concentration can adopt the electrochemical step. Compared to the colorimetry, the electrochemical step can significantly increase the sensitivity and lower the detection limitation. Compared to the apparatus of the flame atomic absorption spectrometry, the concentration detection device according to the preset disclosure is featured with advantages of lower cost and smaller volume, which is favorable for reducing the measurement cost and being carried to different locations for field measurement.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for manufacturing modified metal nanoparticles, comprising:
providing metal nanoparticles, wherein each of the metal nanoparticles is a gold nanoparticle or a silver nanoparticle, the metal nanoparticles are provided by a metal nanoparticle-containing solution, a concentration of the metal nanoparticles in the metal nanoparticle-containing solution ranges from $5\times10^{-6}$ M to $5\times10^{-2}$ M;
providing an ascorbic acid solution, wherein the ascorbic acid solution comprises ascorbic acid molecules and/or ascorbic acid ions, a concentration of the ascorbic acid molecules and/or the ascorbic acid ions in the ascorbic acid solution ranges from 5 wt % to 15 wt %; and
conducting a surface modification step, wherein the metal nanoparticles and the ascorbic acid solution are mixed, a volume ratio of the metal nanoparticle-containing solution and the ascorbic acid solution ranges from 1:0.8 to 1:1.2, such that surfaces of the metal nanoparticles are modified by the ascorbic acid molecules and/or ascorbic acid ions to obtain the modified metal nanoparticles.

2. The method for manufacturing the modified metal nanoparticles of claim 1, wherein a method for manufacturing the metal nanoparticles comprises:
providing a metal ion-containing solution, wherein the metal ion-containing solution comprises metal ions, each of the metal ions is a gold ion or a silver ion; and
a reduction step is conducted, wherein a reductant is added into the metal ion-containing solution to reduce the metal ions, so as to obtain the metal nanoparticles.

3. The method for manufacturing the modified metal nanoparticles of claim 2, wherein the metal ion-containing solution is a chloroauric acid aqueous solution, and the reductant is sodium citrate.

4. The method for manufacturing the modified metal nanoparticles of claim 3, wherein a concentration of the chloroauric acid aqueous solution ranges from 0.0001 M to 0.1 M, and a concentration of the sodium citrate in the chloroauric acid aqueous solution ranges from 0.0001 mM to 0.1 mM.

5. The method for manufacturing the modified metal nanoparticles of claim 3, wherein the reduction step is conducted at a temperature ranging from 70° C. to 130° C. for 10 minutes to 20 minutes.

6. A modified metal nanoparticle, manufactured by the method of claim 1.

* * * * *